United States Patent [19]

Haag

[11] 3,854,860

[45] Dec. 17, 1974

[54] APPARATUS FOR FORMING PLASTIC ARTICLES FROM SHEET MATERIALS

[75] Inventor: John Henry Haag, Evansville, Ind.

[73] Assignee: Kent Plastics Corporation, Evansville, Ind.

[22] Filed: Apr. 9, 1973

[21] Appl. No.: 349,142

Related U.S. Application Data

[63] Continuation of Ser. No. 103,545, Jan. 4, 1971, abandoned.

[52] U.S. Cl.............. 425/502, 264/92, 264/248, 264/250, 425/388, 425/408, 425/436, 425/504
[51] Int. Cl. ................ B29c 17/04, B29c 27/00
[58] Field of Search ...... 264/92, 248, 250; 156/196, 156/500, 476, 485, 382, 581, 583, 212, 242, 245, 295, 292; 425/388, 385, 109, 408, 436

[56] References Cited
UNITED STATES PATENTS

| | | | |
|---|---|---|---|
| 3,195,479 | 7/1965 | Beck et al. | 425/109 |
| 3,362,045 | 1/1968 | Jones-Hinton et al. | 425/388 |
| 3,398,434 | 8/1968 | Alesi, Jr. et al. | 425/388 |
| 3,411,974 | 11/1968 | Jones-Hinton et al. | 425/388 |
| 3,551,954 | 1/1971 | Knowles | 425/388 |

Primary Examiner—Robert L. Spicer, Jr.
Attorney, Agent, or Firm—Gilbert E. Alberding

[57] ABSTRACT

An apparatus and method for thermoforming plastic articles from plastic sheet material, the sheet material being heated and positioned between forming members each of which includes a die face and at least one of which includes one or more plug assists. The forming members are first in a position relative to one another so that each plug assist is aligned with a die face with the sheet material therebetween so that when moved toward one another, the plug assist displaces the sheet material toward the die face. A pressure differential is utilized to urge the sheets into contact with the die faces and maintains this contact while the forming members are then shifted relative to one another so that the die faces are aligned. The die faces are then brought into abutting relationship and the sheets are sealed at the edges of the die face to thus finish forming the resulting hollow article.

4 Claims, 8 Drawing Figures

INVENTOR.
JOHN H. HAAG
BY
Harris & O'Rourke
ATTORNEYS

APPARATUS FOR FORMING PLASTIC ARTICLES FROM SHEET MATERIALS

This is a continuation application of John H. Haag, application Ser. No. 103,545, now abandoned filed Jan. 4, 1971.

BACKGROUND OF THE INVENTION

1. Field of the Invention

This invention relates generally to the formation of hollow plastic articles and, more particularly, to thermoforming of hollow plastic articles from plastic sheet materials.

2. Discussion of the Prior Art

Various method and apparatus are known for mold forming articles from sheet materials. Where such articles to be formed are relatively simple and with few protuberances or areas of required thickness variations, such forming has presented much less of a problem than has forming of complex articles, which due to final article requirements such as protuberances or added thickness areas has often either presented insurmountable problems or created problems, such as thinning of material at undesirable spots, which adversely affect the thus produced hollow article, either in function or appearance, or both.

The use of trap-forming techniques has helped in alleviating this problem, as did the use of various mechanical assist devices, such as plug assists, to positively displace certain portions of the heated plastic sheet and thus better form the desired contour and/or alleviate the problem of varying thickness requirements.

Thus, while plug assists have been utilized heretofore with some success, a problem has still remained where the plug assist was needed in a relatively inaccessible location, such as a needed outward displacement from what would be the interior of a finished hollow article. Devices have been known and utilized for this purpose, but such devices have not completely solved all of the problems due to either being unduly complex and cumbersome, not being completely dependable in achieving the desired results, and/or not having the capability of both forming the desired configuration and finish forming the hollow article.

SUMMARY OF THE INVENTION

This invention provides an apparatus and method for forming hollow plastic articles from sheet materials that is simple and yet is dependable in achieving the desired end. Forming members are utilized having one or more plug assists, the plug assists being first brought into alignment with the die faces of the forming members to displace the sheet toward the die faces upon relative motion between the die faces and plug assists toward one another, the sheets thereafter being maintained in contact with the die faces while the die faces are brought into abutting relationship where the hollow article formation is completed.

It is therefore an object of this invention to provide an improved apparatus and method for forming hollow articles from sheet materials.

It is another object of this invention to provide an improved apparatus and method for forming portions of said article utilizing assist means and thereafter sealing the portions together to form the article.

It is still another object of this invention to provide an improved apparatus and method for forming portions of said articles by using plug assists to displace sheet material toward die faces and thereafter bringing the die faces now in abutting relationship to finish forming of a hollow article.

It is yet another object of this invention to provide an apparatus and method for thermoforming hollow plastic articles from sheet materials wherein said heated sheet materials are displaced by plug assists, the sheets being held thereafter in contact with die faces, and the die faces brought together for sealing the sheets at the edges of the die faces.

With these and other objects in view, which will become apparent to one skilled in the art as the description proceeds, this invention resides in the novel construction, combination and arrangement of parts substantially as hereinafter described, and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DETAILED DESCRIPTION OF THE PREFERRED EMBODIMENT

Figure 1:
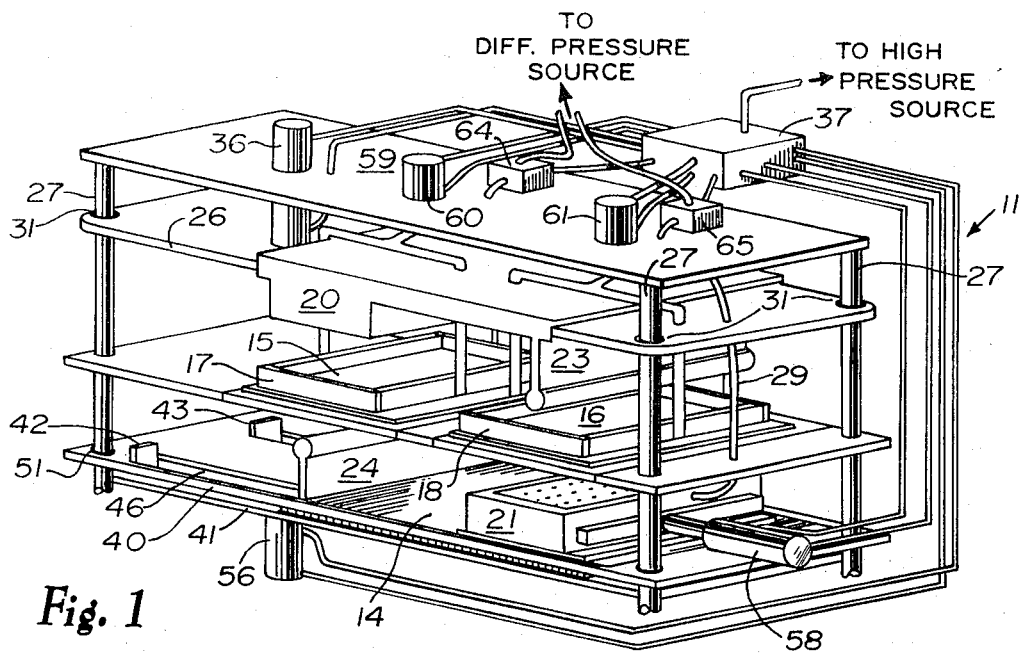
FIG. 1 is a perspective view of the hollow plastic article forming apparatus of this invention.

Referring now to the drawings, in which like numerals have been used for like components, hollow article forming apparatus 11 includes upper and lower forming members, or platens 13 and 14, having sheets of plastic material 15 and 16 positioned therebetween by frames 17 and 18.

Forming members 13 and 14 each have attached thereto a die face 20 and 21, respectively, which have the desired contour of the finished article. In addition, each of the forming members includes a plug assist 23 and 24, respectively, spaced from the die face in a fixed position with respect thereto.

As shown in the drawings, plug assists 23 and 24 preferably each include a bar which extends lengthwise with respect to each said die face so as to be engageable with the plastic sheet to assist in forming a particular curvature of the formed article. It is to be realized, however, that the plug assist can be shaped as necessary for a particular usage, and could, for example, be oblong, rectangular, or a rod to which a ball is attached, depending upon the area needing assist in formation.

As shown in FIG. 1, upper forming member 13 is mounted on support plate 26, which plate is constrained to vertical movement by rods 27 which are received through apertures 31 near each of the four corners of the plate. The vertical travel of forming member 13 may be controlled by conventional fluid motor 36, which, for example, could be a pneumatic or a hydraulic cylinder, and which motor is, in turn, controlled by conventional control unit 37 for sequencing the machine through the operational steps in known manner, either automatically or manually, as, for example, through use of multi-ported valve control block 37 (as indicated in FIG. 1) which opens and closes specific ports at predetermined times to cause the operational steps to be performed in sequence. It is to be realized, of course, that other conventional control units could be utilized, as, for example, an electronic control unit controlling solenoid actuated valves in predetermined manner.

Lower forming member 14 is seated on plate 40 and slidably supported thereon. Stop pins 42 are provided in elongated slots 46, said lower forming member having portions extending through said slots so that said forming member is constrained to lengthwise horizontal movement reciprocally along a path the length of which is determined by the length of the slots and stop pins therein, the paths of travel being such as to align each die face with the plug assist of the upper forming member in one position and aligned with the die face of the upper forming member when in the opposite position at the other end of travel along the slots.

Plate 40 is constrained to vertical movement by rods 27, plate 40 being slidably secured to the rods at apertures 51 at the corners of plate 40 at which point the rods 27 extend through plate 40. Rods 27 are fixedly attached to plate 41, which is a part of the frame.

Plate 40 is moved by motor 56 which is controlled by control unit 37. Thus, if desired, the forming members may be moved in unison toward and away from one another by the respective fluid motors. Forming member 14 is moved horizontally by fluid motor 58 which controls the positioning of the lower forming member 14 to either align the die faces or align each die face 20 and 21 with a plug assist 23 or 24. Fluid motor 58 is also controlled conventionally by control unit 37.

Rods 27 are also attached to the upper portion of the frame, as is fluid motor 36, with fluid motor 56 being attached to plate 41 of the frame, and fluid motor 58 being attached to plate 40. In addition, the upper portions of frames 17 and 18 are moved toward and away from the lower frames by means of fluid motors 60 and 61 which are controlled by control unit 37 so that plastic sheet material is clamped between the frames when the upper and lower frames are in abutting relationship. The die faces are connected with sources of differential pressure (not shown) as is well known, for example, by means of a fan (not shown), through tubes 28 and 29 and outlets 32 and 33 in the die faces to pull, or urge, the sheet material into contact with the die faces and maintain this relationship until the hollow article formation is completed. The application of differential pressure from the source to the die faces is controlled conventionally by control mechanism 37 actuating valves 64 and 65 between open and closed positions.

Figure 2:
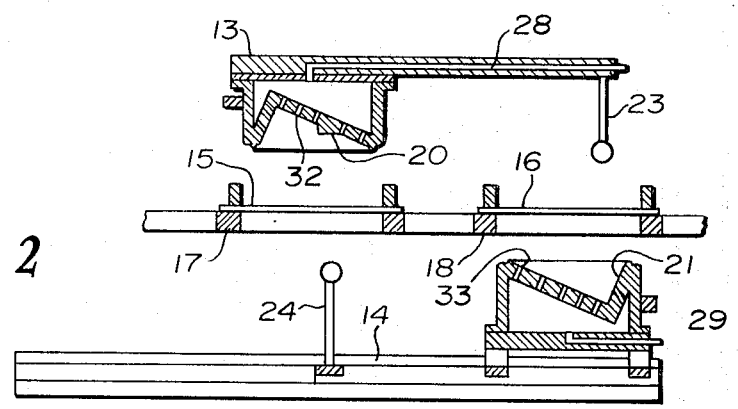
FIGS. 2 through 7 are partial cross-sectional views of the article forming apparatus shown in FIG. 1 illustrating the various forming positions of the apparatus.
Figure 3:
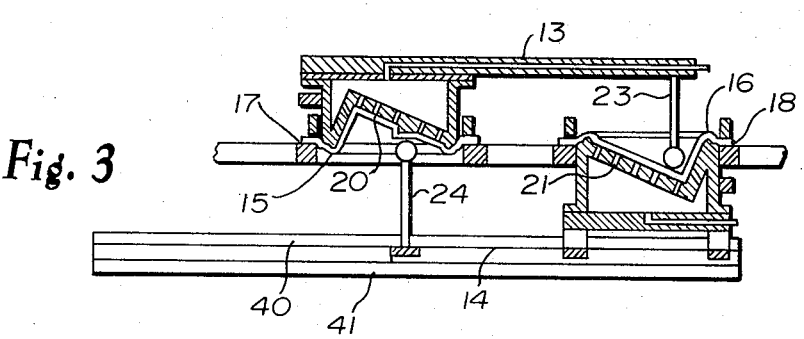

In operation, and referring now to FIGS. 2 through 7, heated plastic sheets are clamped in frames 17 and 18 while the forming members are in the retracted position as shown in FIG. 2. The forming members 13 and 14 are also positioned at this time with the plug assists 23 and 24 aligned with the die faces 20 and 21, and as shown in FIG. 3, the forming members 13 and 14 are then moved toward one another so that the plug assists 23 and 24 displace the plastic materials 15 and 16 toward the die faces 20 and 21 to engage the sheet materials 15 and 16 where difficult forming areas have been found to exist. At this time, the differential pressure 62 is established so that the sheet material is pulled into contact with each die face 20 and 21 by a negative pressure applied through tubes 28 and 29 in forming members 13 and 14 and outlets 32 and 33 in die faces 20 and 21, as shown in FIG. 2.

Figure 4:
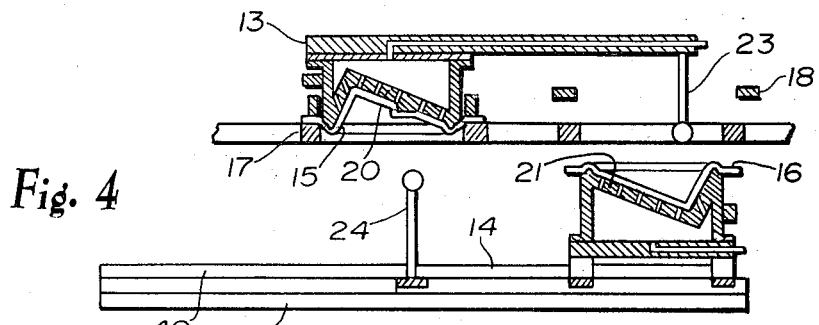
Figure 5:
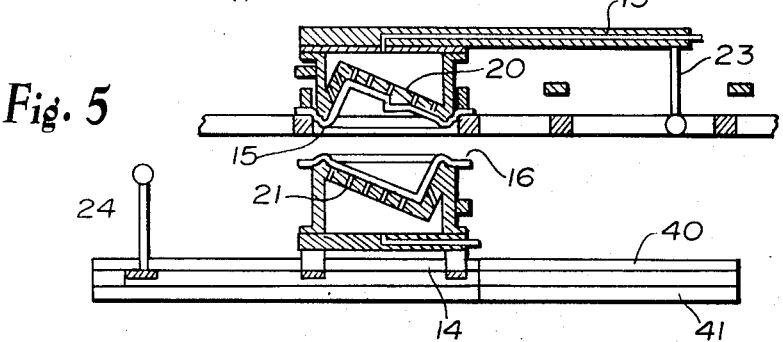
Figure 6:
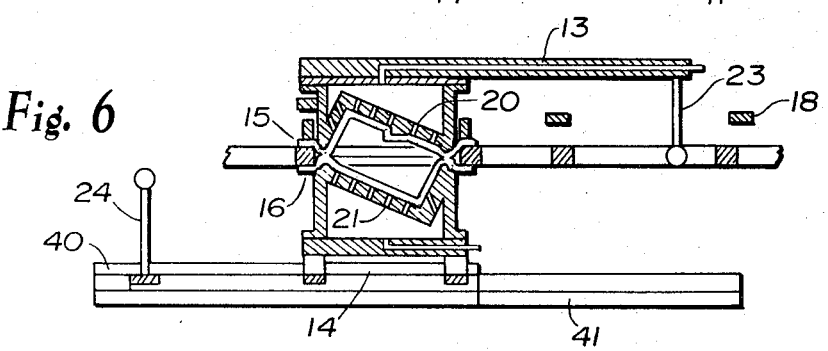

The forming members are now moved away from one another, as shown in FIG. 4, and frame 18 is released by moving the upper portion away from the lower portion, so that the sheet material 16 is maintained in contact with the die face 21, as the die face is retracted. As shown in FIG. 5, the die faces are then brought into alignment, and the forming members brought toward one another and into abutting relationship as shown in FIG. 6. This seals the sheets together at the edges of the die faces and thus finishes formation of the hollow article.

Figure 7:
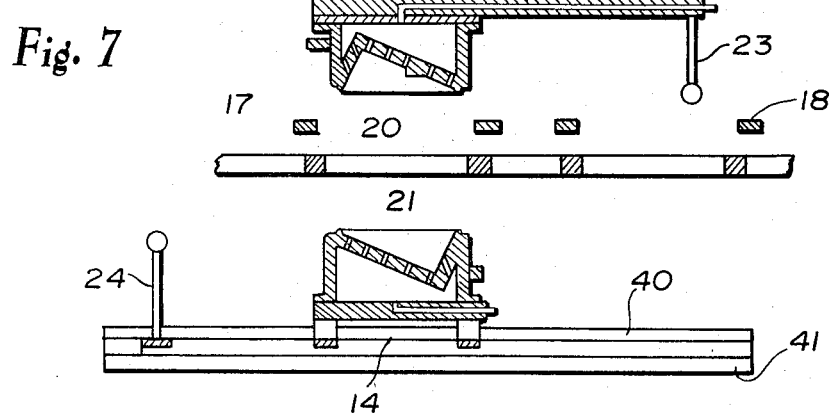
Figure 8:
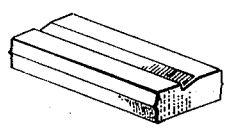
FIG. 8 is a perspective view of a typical hollow plastic article formed by the apparatus of this invention.

As shown in FIG. 7, the forming members are then withdrawn from one another and the hollow article (shown typically in FIG. 8) is removed from the apparatus. The realignment of the die face with the plug assist completes the sequence of steps.

If a multi-ported valve block is utilized to control the sequence of steps, the ports are positioned to open into the bore of the valve body so that as the piston, or plunger, is moved, different ports are opened and closed to cause the various fluid motors to be actuated to move the forming members and frame at the desired times, as is conventional. The foregoing, of course, is meant only to be illustrative of one example of a control unit that might be utilized. If desired, an electronic control unit, or timer, can also be utilized in conjunction with conventional electrically controlled valves to be opened and closed at predetermined times, as is also conventional, in order to achieve the sequence of steps above set forth.

It is to be realized, of course, that the structure could be altered or modified as necessary, in view of a particular article to be formed or to cause the relative movement in a manner other than specified herein, and that the plug assists could be modified in form or number, as might be desirable or necessary in any particular instance.

From the foregoing, it can be seen that this invention provides an improved apparatus and method for forming hollow plastic articles from plastic sheets.

What is claimed is:

1. Apparatus for forming hollow plastic articles from sheet material, said apparatus comprising: a supporting frame structure, first and second cooperable forming members each of which include a die face of predetermined contour, said forming members being movably mounted to said supporting frame to permit relative reciprocal movement therebetween in two substantially perpendicular directions, the first of said directions being to bring said die faces together and apart, at least one plug assist means comprising a rod having a rounded ball section connected thereon, said rod fixedly mounted to one of said forming members and disposed from the die face of that forming member in the second of said directions of reciprocal movement, said rounded ball section of said rod defining an engaging surface for contact along being substantially smaller than the total surface of said sheet material, means for positioning plastic sheet material adjacent each of said die faces, means for urging the forming members to one extreme of the reciprocal movement in the second direction and aligning the at least one rod opposite the die face of the other forming member, means for urging the forming members and attached die faces and said rod attached thereto together and apart through the reciprocal movement in said first direction thereby urging the sheet material against at least one die face by means of said engaging surface of said rod, means for releasably securing the sheet material to the die faces, means for urging forming members to the other extreme of reciprocal movement in the second direction and aligning the opposed die faces and means for bringing the die faces and sheet material together whereby a hollow plastic article is formed.

2. The apparatus of claim 1 wherein each of said forming members include a rod having a rounded ball section connected thereon, and wherein each rod displaces sheet material in opposite directions toward the die face of the other forming member.

3. Apparatus for thermoforming hollow plastic articles from plastic sheet material, said apparatus comprising: a first die member having a die face of predetermined contour and a first plug assist means comprising a rod spaced therefrom, said rod having a rounded ball section thereon; a second die member having a die face of predetermined contour and a second plug assist means comprising a rod spaced therefrom, said rod having a rounded ball section thereon; said first rod being fixedly attached to said second die member and said second rod being fixedly attached to said first die member, said first and second rods defining upon said rounded ball section of each an engaging surface for contact along preselected points of the plastic sheet material, said engaging surface of each rod being substantially smaller than their corresponding surface of said plastic material; frame means for positioning first and second sheets of heated plastic material adjacent each of said die members; a first drive means for moving one of said die members relative to the other between a first position in which said rods are each aligned with a predetermined portion of the die face of the other die member and in a second position in which said die faces are aligned with one another; a second drive means for relative movement of said die members toward and away from one another; pressure differential means associated with each said die face for pulling sheet material into contact with the die face; and control means for causing said first drive means to move said die members to said first position, for causing said second drive means to move said die members toward one another so that said rounded ball sections of said rods displace said heated plastic sheets toward said die faces, and for causing said pressure means to pull said plastic sheets into contact with said die faces, said control means thereafter causing said second drive means to move said die members away from one another, causing said first drive means to move said die members to said second position, causing said die members to again be moved toward one another so that said die faces are brought into abutting engagement, and causing said pressure differential means to maintain said plastic sheets in contact with said die faces until said hollow article is formed by bringing said die faces into abutting relationship with one another, said control means causing said second drive means to move said die members away from one another after said die faces have been in abutting relationship to release said hollow article thus formed.

4. Apparatus for forming hollow plastic articles from sheet material, said apparatus comprising: first and second cooperable forming members at opposite sides of sheet material, each of said forming members including a die face of predetermined contour with at least one of said forming members also including attached to the other of said forming members an assist means comprising a rod having a rounded ball section connected thereon, said rod defining upon said rounded section an engaging surface for contact along preselected points of the sheet material, said engaging surface being substantially smaller than the total surface of said sheet material; first drive means for causing relative movement between said forming members in a first direction whereby in one position one of said die faces is aligned with said rod attached to the other of said forming members with said sheet material therebetween and in a second position said die faces are aligned with one another with said sheet material therebetween; and second drive means for causing relative movement between said forming members in a second direction in one position of which said forming means are spaced from said sheet means and in a second position of which said forming means engage said sheet material.

* * * * *